United States Patent [19]

Condra et al.

[11] Patent Number: 5,199,888

[45] Date of Patent: Apr. 6, 1993

[54] APPARATUS FOR COVERING THE ELECTRICAL CONNECTORS OF A NOTEBOOK COMPUTER

[75] Inventors: Neil L. Condra, The Woodlands; James R. Utz; Thomas Mitchell, both of Houston, all of Tex.

[73] Assignee: Compaq Computer Corporation, Houston, Tex.

[21] Appl. No.: 825,018

[22] Filed: Jan. 24, 1992

[51] Int. Cl.$^5$ ........................................... H01R 13/447
[52] U.S. Cl. .................................... 439/142; 312/292; 361/380; 439/136
[58] Field of Search ................. 439/136, 142, 928; 361/390, 391, 392, 393, 394, 395, 399, 380; 364/708; 312/292, 300, 311, 328; 220/241, 242, 254; 49/164, 166, 169

[56] References Cited

U.S. PATENT DOCUMENTS

| | | | |
|---|---|---|---|
| 3,140,344 | 7/1964 | Slater | 439/142 |
| 4,478,005 | 10/1984 | Mundschenk | 312/328 |
| 5,117,378 | 5/1992 | Ho | 364/708 |

OTHER PUBLICATIONS

IBM Personal System/2 ® Model P70 386 Quick Reference, First Edition (Mar. 1989), ©Copyright International Business Machines Corporation 1988, pp. 6, 7, 10 and 49 of the brochure (6 pages total).
One sheet with four (4) polaroid photographs (numbered 1, 2, 3A and 3B of the IBM Personal System/2 ® Model P70 386.
Momenta User's Reference Manual; Copyright 1991 by Momenta Corporation, pp. from "Connecting the Keyboard and the Stylus 1.2"; Setting Up the Screen 1.4; Chapter 1: Setup 1.11, (6 pages total).
IBM Personal System/2 ® Model P70 386 Quick reference, First Edition (Mar. 1989), ©Copyright International Business Machines Corporation 1988, 90 pages total.
12 photographs of Toshiba T3300SL notebook computer (A-L), 4 sheets total.
386SX Notebook PC System; ©1991 Wang Laboratories (Taiwan) Ltd.; Printed in Taiwan Aug. 1991; Revised Apr. 15, 1992; 2 pages total.
AT&T Safari NSX/20 User's Guide, 562-200-143 Issue 1, ©1991 AT&T; System Description (Rear Panel Connections) pp. 1-4 of User's Guide; 3 pages total.

IBM Personal System/2 Model L40 SX Quick Reference, First Edition (Feb. 1991) ©Copyright International Business Machines Corporation 1991; Setting Up Your Computer; Getting Started; p. 6 of brochure; 3 pages total.
Zenith data systems, MastersPort 386SL Owner's Manual 595-4912; Copyright 1991 by Zenith Data Systems Corporation; Printed in United States of America; External Floppy Disk Drive and External Video Monitor, pp. 3-10 of Owner's Manual; 3 pages total.
Everex Tempo Carrier Owner's Manual; ©Everex Systems, Inc., 1991, Nov. 1991 Edition; The Back of the Tempo Carrier, p. 10, 3 pages total.
AST Premium ® Exec User's Manual, Notebook-Sized AT-Compatible Computer, Third Edition (Aug. 1991), Copyright 1991 AST Research, Inc.; FIG. 3-3. Opening the Battery Compartment; FIG. 3-4. Connecting the AC Adapter; 4 pages total.
Dell System ® 325NC User's Guide, ©1989-1992 Dell Computer Corporation; Printed in the United States of America, Jan. 1992; Using Your Computer, pp. 2-7; 3 pages total.
Toshiba T3300SL Notebook Computer Reference Manual, C148-1291M1; ©1992 by Toshiba Corporation; 3 pages total.

*Primary Examiner*—Neil Abrams
*Attorney, Agent, or Firm*—Pravel, Gambrell, Hewitt, Kimball & Krieger

[57] ABSTRACT

An improved cover assembly for the electrical connectors of a notebook computer. The notebook computer of the present invention is adapted to be connected by electrical connectors with an expansion base. The improved cover assembly includes a cover plate hinged to the housing of the notebook computer movable relative to the housing between an uncovered position and a retained position. The cover plate includes a slidable door being sized so as to allow connection of a preselected connector of the notebook computer. The improved cover assembly can be adapted to allow the notebook computer to be connected to the expansion base while the remaining notebook computer electrical connectors are covered to reduce the amount of undesirable foreign matter in the open ended connectors that can reduce connection performance.

20 Claims, 5 Drawing Sheets

APPARATUS FOR COVERING THE ELECTRICAL CONNECTORS OF A NOTEBOOK COMPUTER

BACKGROUND OF THE INVENTION

1. Field of the Invention

This invention relates generally to an apparatus for covering the electrical connectors of a notebook computer and, more particularly, to a hinged cover assembly having a sliding door adapted to allow access to a preselected electrical connector while covering the remaining electrical connectors on the notebook computer.

2. Background of the Invention

There are devices in common use for covering the electrical connectors on notebook computers. Such devices provide a cover plate that allows coverage of the electrical connectors on the notebook computer or, alternatively, allows access to the electrical connectors on the notebook computer.

Some of the earlier cover assemblies simply snapped on and off the housing of the notebook computer so that the cover plate was completely removable from the housing. Subsequently, improved cover assemblies were movably attached to the housing to both reduce inadvertent removal of the cover and reduce misplacing the cover after it was removed.

Compaq Computer Corporation of Houston, Tex. has manufactured and sold notebook computers as shown in FIGS. 1-6 which are adapted to connect to an expansion base. The two illustrated notebook computers have movable cover assemblies for covering the electrical connectors.

Figure 1:
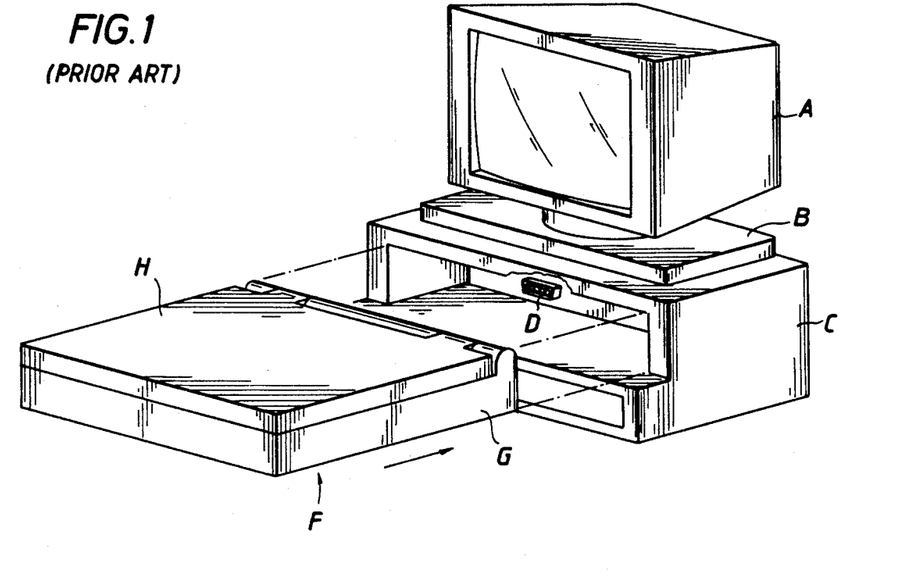
FIG. 1 is a perspective view of a prior art computer system including a notebook computer, an expansion base and a monitor.
Figure 2:
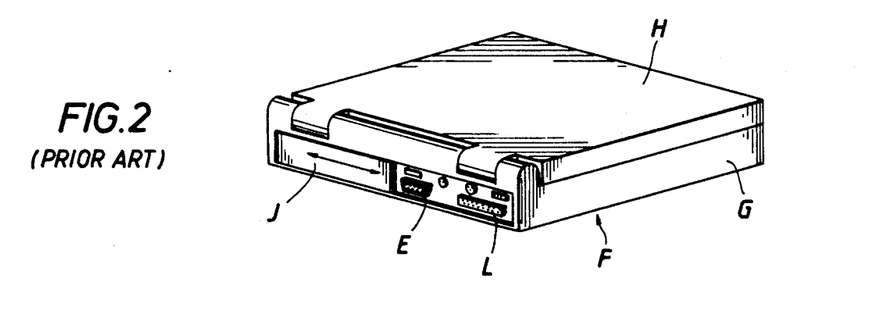
FIG. 2 is a perspective rear view of the notebook computer as shown in FIG. 1.
Figure 3:
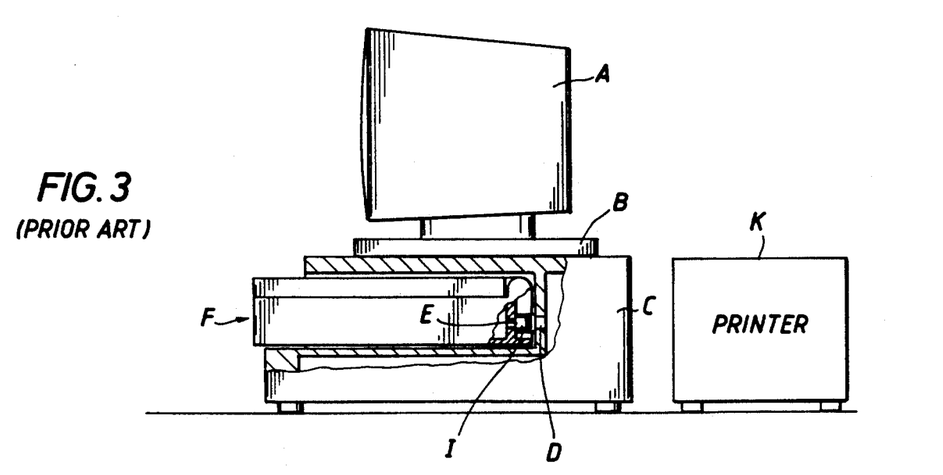
FIG. 3 is a side view of the prior art computer system of FIG. 1 along with a printer where the expansion base and the notebook computer are cutaway to better illustrate the electrical connection of the expansion base and the notebook computer.

FIGS. 1-3 illustrate a notebook computer Model LTE 386s/20 manufactured by Compaq Computer Corporation which includes a cover plate slidable relative to the computer housing between an uncovered position and a covered position. When the cover plate is slid to its uncovered position, as best shown in FIG. 2, all the electrical connectors are accessible including an expansion base connector. Some other electrical connectors on this LTE 386s/20 notebook computer, also commonly found on other notebook computers, include an A/C adaptor/battery charger connector; mouse connector; numeric keypad connector; video connector; parallel printer connector and serial connector.

Though the cover plate of FIG. 2 could be partially slid open to expose only some of the connectors, the configuration of any of the above connectors including the expansion base connector, along with their relative position to one another on the notebook computer, would not allow access to a preselected connector without undesirably exposing another electrical connector.

Figure 4:
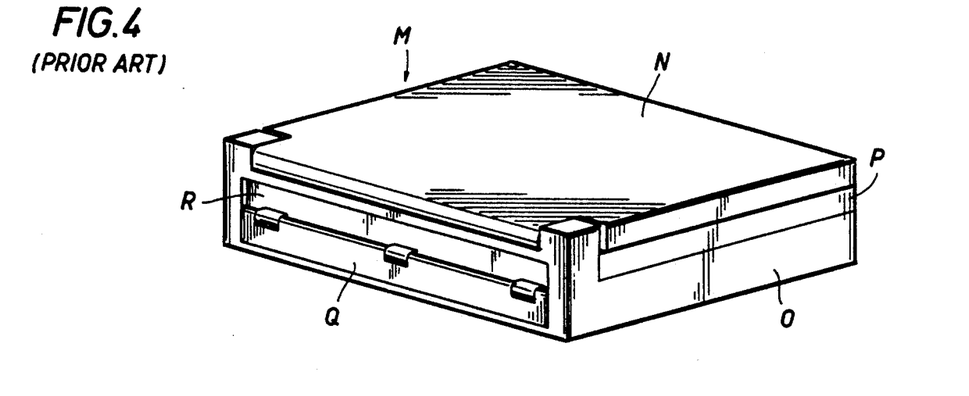
FIG. 4 is a perspective rear view of a prior art laptop computer with the cover plate in the covered position.
Figure 5:
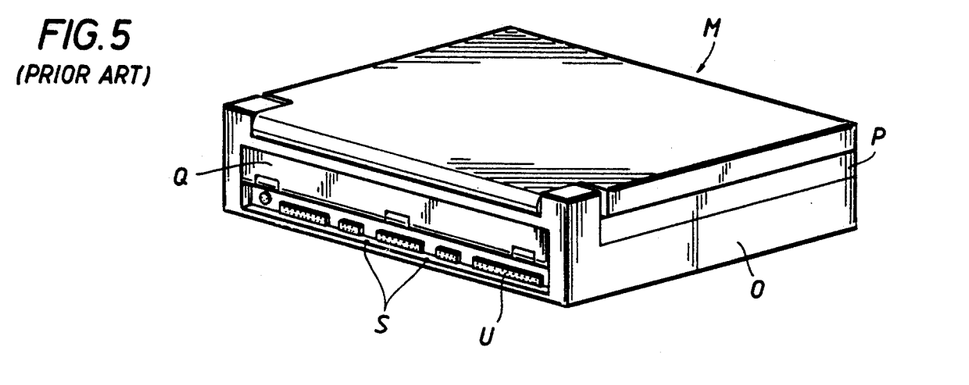
FIG. 5 is the laptop computer of FIG. 4 with the cover plate in the uncovered position.
Figure 6:
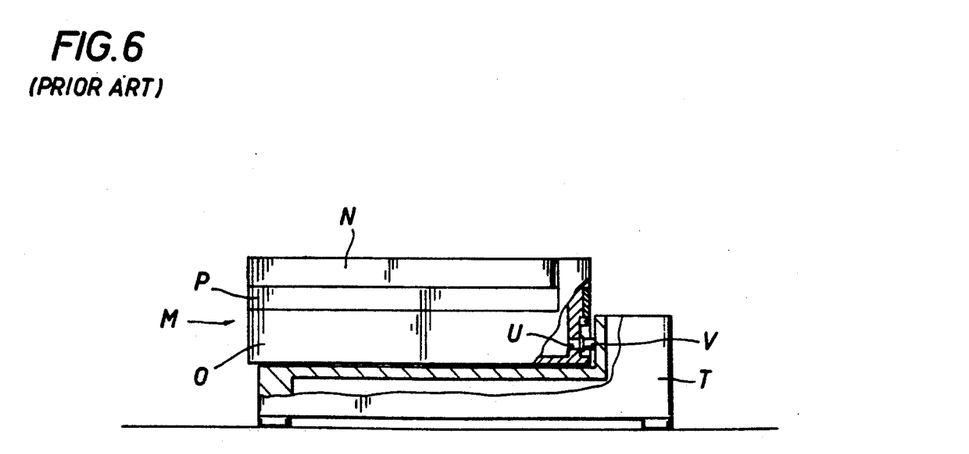
FIG. 6 is a side view of the laptop computer as seen in FIGS. 4 and 5 with an expansion base and the laptop computer being cutaway to better illustrate the connection of the laptop computer to the expansion base.

FIGS. 4-6 illustrate a laptop computer Model SLT 286, also manufactured by Compaq Computer Corporation. The SLT 286 notebook computer includes a single cover plate that is centrally hinged so that the cover plate can be flipped between an uncovered position, by pivoting the cover plate into the recess in the upper portion, as best shown in FIG. 5, or the covered position, by pivoting the cover plate to the lower portion to cover all the electrical connectors, as best shown in FIG. 4.

None of the above cover assemblies allow access to a preselected connector without undesirably exposing other electrical connectors on the computer. It is known to those skilled in the art that the exposure of the open ends of the electrical connectors undesirably permits introduction of foreign matter into the connectors that can reduce the performance of the connectors or produce erroneous operation of the computer.

Particularly when laptop or notebook computers are used with expansion bases, there has been a need for a cover assembly that permits access to a plurality of electrical connectors when the computer is used independent of the expansion base or, alternatively, the cover plate can cover the remaining connectors of the notebook computer while allowing access to the expansion base connector. The expansion base connector provides electrical connection of the computer to the expansion base.

Additionally, there has been a need for a cover plate that can cover the remaining connectors of the notebook computer while allowing access to a printer connector when the notebook computer is used independent of the expansion base.

SUMMARY OF THE INVENTION

According to the invention an improved cover assembly for the electrical connectors of a notebook computer is provided. The notebook computer of the present invention is adapted to be connected by electrical connectors with an expansion base.

The improved cover assembly includes a cover plate, hinged to the housing of the notebook computer, pivotable relative to the housing between an uncovered position and a retained position. Blocking shoulders are provided to limit pivotal movement of the plate relative to the housing. The cover plate has an opening which is adapted to receive a slidable door sized so as to allow access to a preselected electrical connector of the notebook computer.

Advantageously, the improved cover assembly allows the preselected electrical connector of the notebook computer to be connected while the remaining notebook computer electrical connectors are covered to reduce the amount of undesirable foreign matter in the connectors.

The cover assembly advantageously comprises a resilient finger positioned at each end of the cover plate so that the fingers can be received into their respective retaining slots in the housing. The resilient fingers are movable relative to the housing between an extended interference position and a retracted position for allowing movement of the plate between the uncovered position and the retained position. Additionally, tabs are provided adjacent to the resilient fingers to facilitate opening of the cover assembly.

BRIEF DESCRIPTION OF THE DRAWINGS

The objects, advantages and features of the invention will become more apparent by reference to the drawings which are appended hereto and wherein like numerals indicate like parts and wherein an illustrated embodiment of the invention is shown, of which.

DESCRIPTION OF THE PREFERRED EMBODIMENT

As previously discussed, FIGS. 1-3 illustrate a computer system including a notebook computer Model No. LTE 386s/20. This computer system includes a monitor A having a base B which can be removably positioned on and electrically connected to an expansion base C. The expansion base C includes an expansion base connector D aligned so as to connect with the expansion base connector E of the notebook computer, generally indicated as F, as best shown in FIG. 2. The notebook computer F includes a base G and a conventional pivotable liquid crystal display H that can be used when the notebook computer F is used independent of the expansion base C.

As best shown in FIG. 3, the notebook computer F is slid inside the cavity of the expansion base C until the expansion base connection I of the notebook computer F to the expansion base C is achieved. Returning to FIG. 2, the cover plate J slides relative to the notebook computer F between an uncovered position and a covered position. When the cover plate J is slid to its uncovered position, all the electrical connectors are accessible including the expansion base connector E. The door J can be slid to the closed position so that all the electrical connectors are covered.

FIGS. 4-6 illustrate a laptop computer, the Model SLT 286, as generally indicated by M, that includes a pivotal monitor screen N and a base 0 with a keyboard P positioned therebetween. A single cover plate Q is centrally hinged so that the cover plate can be flipped between an uncovered position, as best shown in FIG. 5, by pivoting the cover plate Q into the upper portion R, or the covered position, as best shown in FIG. 4, by pivoting the cover plate Q to the lower portion to cover all the electrical connectors.

In the covered position, the cover plate Q engages two nubs S, as best shown in FIG. 5, to retain the plate Q in the retained or covered position.

Turning to FIG. 6, the expansion base T is electrically connected with the notebook computer M by the expansion base connector U of the notebook computer with the connector V of the expansion base T, as best seen in FIGS. 5 and 6.

Figures 7, 8:
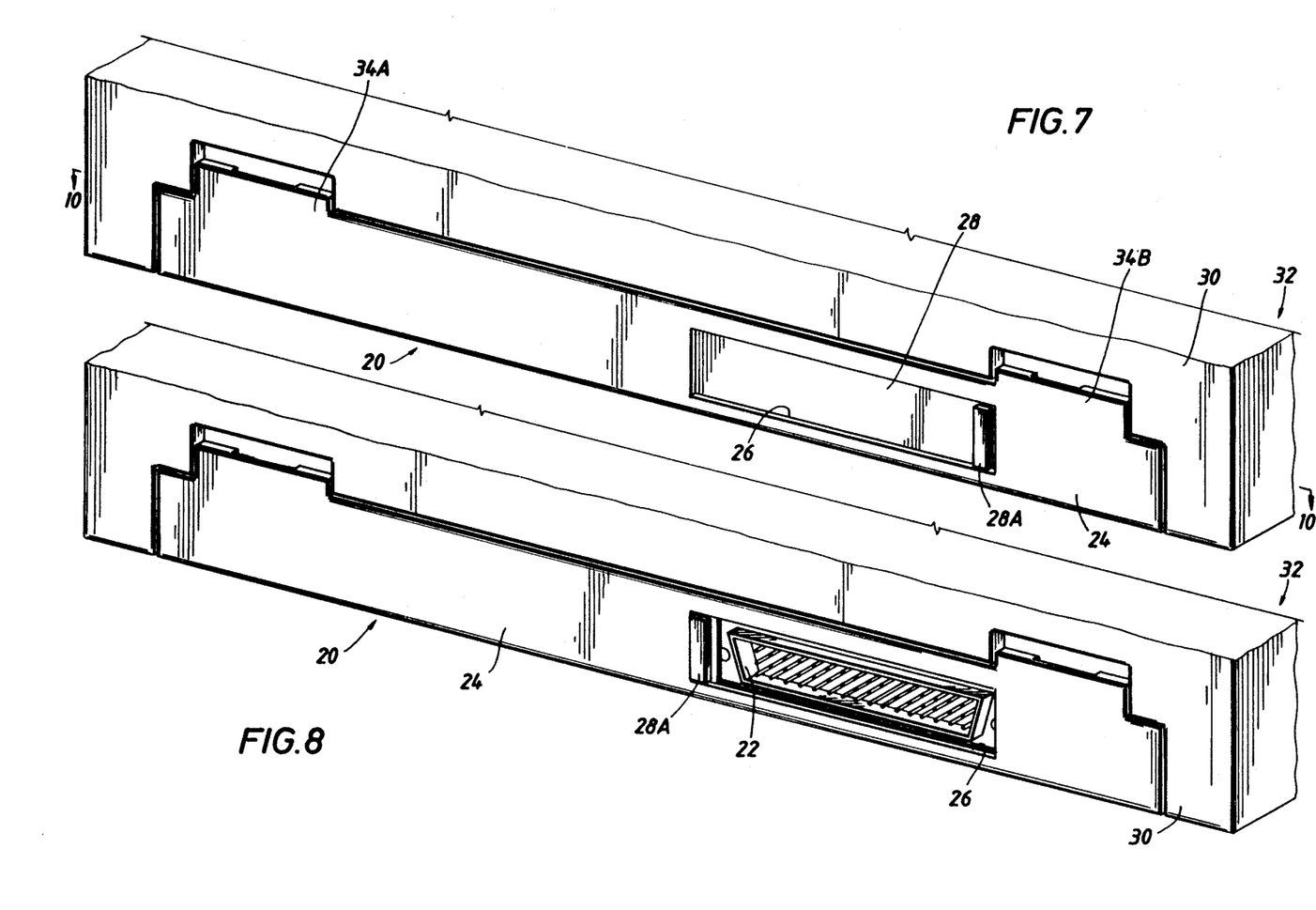
FIG. 7 is a fragmentary perspective rear view of the notebook computer of the present invention showing the door in the closed position and the cover plate in the retained position.
FIG. 8 is the notebook computer of FIG. 7 showing the cover plate in the retained position but the door in the open position to allow access to a preselected connector.

The preferred embodiment of the cover assembly of the present invention, generally indicated by 20 in FIGS. 7 and 8, is adapted for use with a conventional expansion base such as shown in FIGS. 1, 3 and 6 but, preferably, with an expansion base similar to that of FIGS. 1 and 3. The cover assembly is preferably molded from plastic. The expansion base connector 22 can be electrically connected with the expansion base connector D of expansion base C, though any other type or configuration of an expansion base whose connector would accept the present invention is included in its intended use.

The cover assembly 20 includes a cover plate 24 having an opening 26. The opening 26 is sized to allow access to a preselected connector, preferably an expansion base connector 22 but alternatively a parallel or printer connector, as best seen in FIG. 8. A door 28 is sized to cover the cover plate opening 26, particularly when the plate is in the retained position. The door 28 is slidable relative to the plate opening 26 between a closed position, as best seen in FIG. 7, and an open position, as best seen in FIG. 8, to allow access to the expansion base connector 22 or any other preselected connector to provide electrical connection to the notebook computer. The door 28 includes a handle 28A to facilitate opening of the door.

The cover assembly further includes tabs 34A and 34B adjacent to each end of the plate 24 to facilitate moving the cover plate 24 to the uncovered position. Each tab 34 has a beveled surface 36A and 36B to allow access by a finger, as best shown in FIG. 9.

Figures 9, 10:
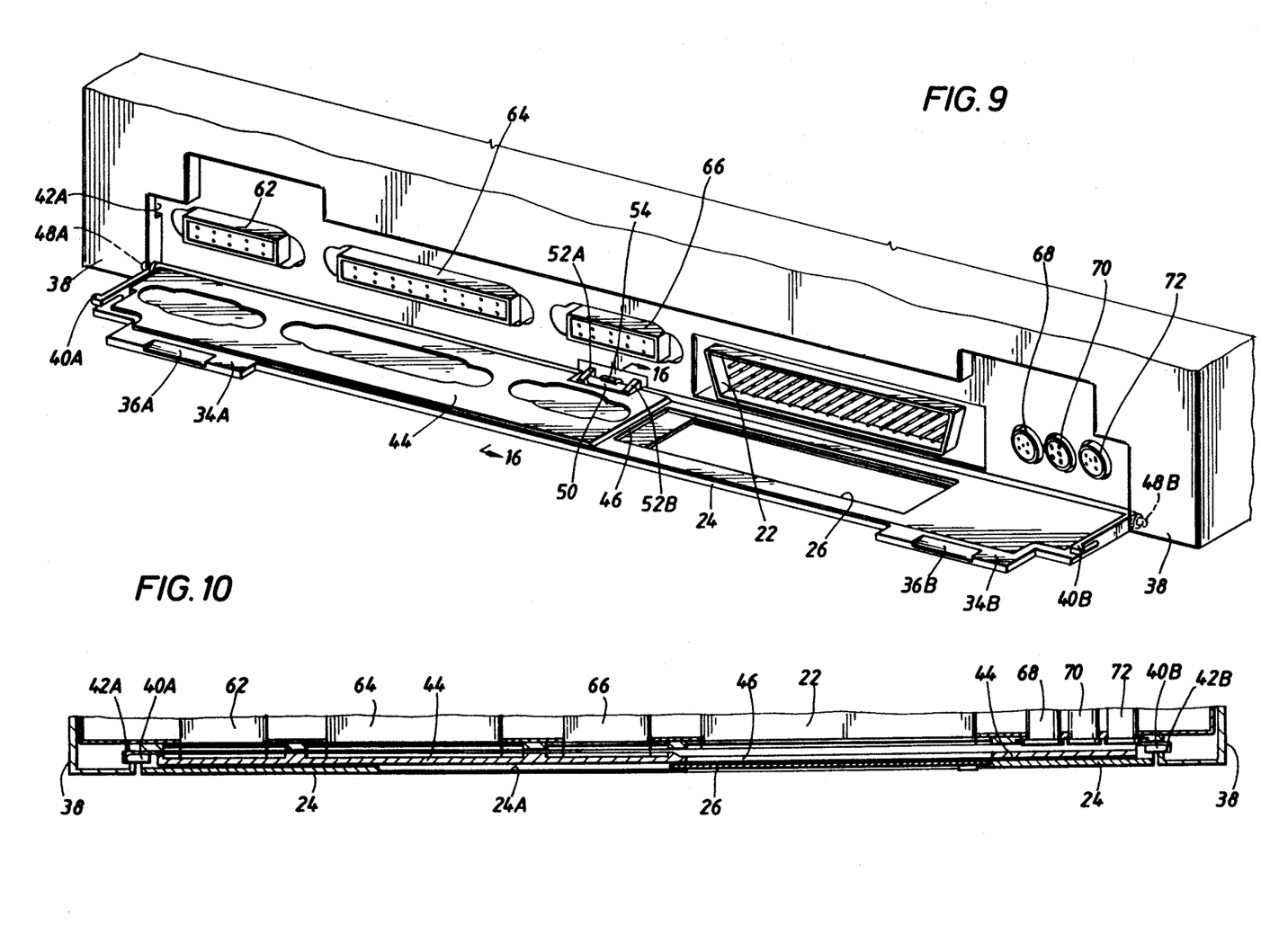
FIG. 9 is the notebook computer of FIG. 7 showing the cover plate in the uncovered position.
FIG. 10 is a section view taken along lines 10—10 of FIG. 7.
Figure 11:
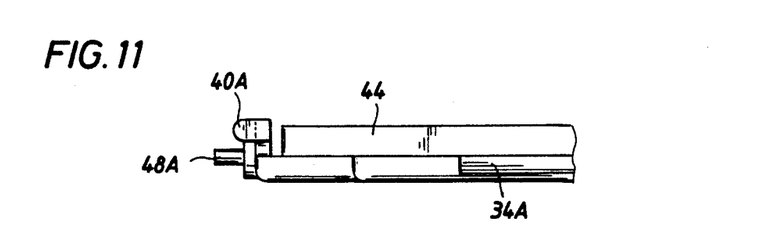
FIG. 11 is an enlarged fragmentary plan view of the cover plate shown in FIGS. 7-10 but assembled from the notebook computer.
Figure 12:
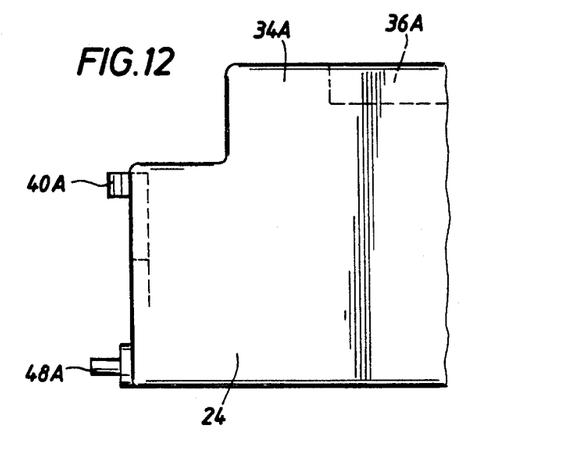
FIG. 12 is a front view of the cover plate shown in FIG. 11.
Figure 13:
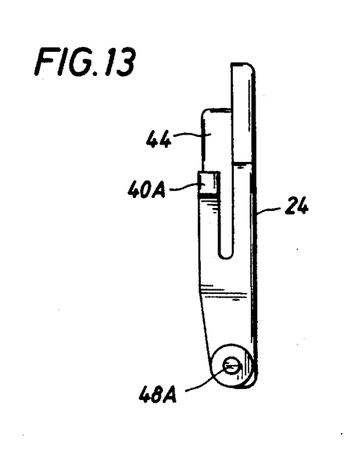
FIG. 13 is a side view of the cover plate shown in FIG. 11.

When the plate 24 is in the retained position, as shown in FIGS. 7, 8 and 10, the outside surface of the plate 24 is substantially flush with the rear surface 30 of the notebook computer, generally indicated at 32. FIGS. 9 and 10 disclose the retaining means interengaged with the housing 38 of the notebook computer 32 and the plate 24 for positioning the plate 24 in the prearranged relationship to the housing 38. The retaining means includes resilient elongated fingers 40A and 40B molded with the plate 24 and retaining slots 42A and 42B in the housing 38. The resilient elongated fingers 42 are movable relative to the housing 38 between an extended interference position with the housing and an inwardly retracted position for allowing movement of the plate between the uncovered position, as shown in FIG. 9, and the retained position, is shown in FIG. 10. The ends of the resilient fingers 40 are curved to facilitate movement of the fingers from the extended position to the retracted position. An enlarged detailed view of the resilient finger 40A, as shown in FIGS. 11-13, is a mirror image of the finger 40B.

Figure 14:
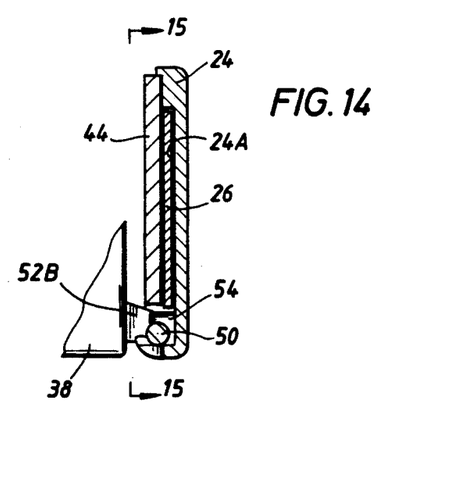
FIG. 14 is a section view of FIG. 7 of the cover assembly and intermediate hinge/stop with the door in the open position.
Figure 15:
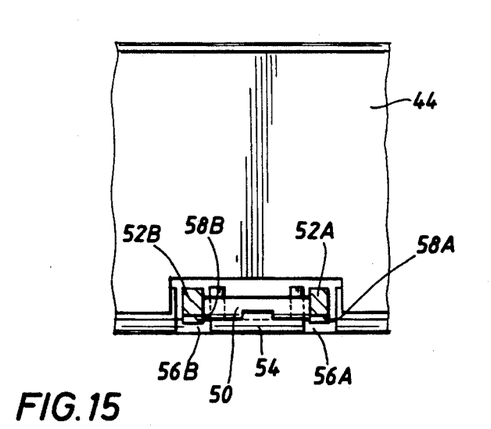
FIG. 15 is a fragmentary section view taken along lines 15—15 of FIG. 14.
Figure 16:
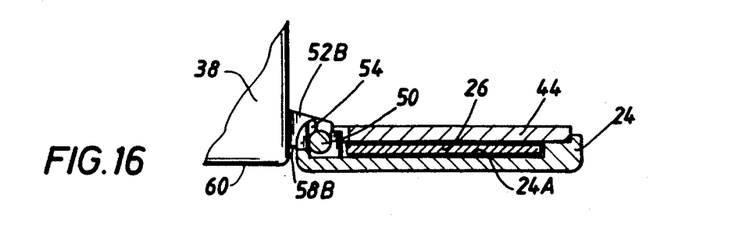
FIG. 16 is a section view taken along lines 16—16 of FIG. 9.

As best shown in FIGS. 9-16, the cover assembly further comprises a second or inner plate 44 having an opening 46. The inner plate once positioned on the inside of the cover plate controls and guides relative sliding movement of the door 26 between the plates 24, 44. The guide means preferably includes a recess 24A in the inside surface of cover plate 24, as seen in FIGS. 10, 14 and 16. A number of molded plastic protuberances on the inside surface of the inner plate 44 and a number of corresponding molded grooves on the inside surface of the cover plate 24 provide proper alignment of the plates. Once properly aligned, the plates can be glued, heat welded, ultra sonically welded or any other conventional means to secure the plates together. The inner plate 44 is adapted to interengage with the cover plate 24 so that the cover plate opening 26 is aligned with the inner plate opening 46 to allow access to the preselected connector, preferably the expansion base connector.

Preferably, three hinges are used to interengage the housing 38 of the notebook computer 32 and the cover plate 24 for controlling relative pivotal movement of the plate 24 to the housing 38. A first pin 48A is received in an aperture in the housing 38, as best shown in phantom view in FIG. 9, and a second pin 48B at the other end of the plate 24 is also received in another aperture in the housing. An enlarged detailed view of the pivotable pin 48A, shown in FIGS. 11-13, is a mirror image of the pin 48B.

The third hinge also provides a stop for limiting pivotable movement of the plate 24 relative to the housing 38. Shaft 50 is secured to the housing 38 by end members 52A and 52B, as best shown in FIGS. 9, 14-16. A clasp 54 preferably molded with the plastic cover plate 24 is sized to snap onto the shaft 50 to provide pivotal movement of the plate 24 in combination with the pins 48. Preferably, blocking shoulders 56A and 56B molded on plate 24 engage blocking shoulders 58A and 58B molded on end members 52. The blocking shoulders 56, 58 are positioned so that the cover plate 24 preferably pivots 90° relative to the housing 38. The plate 24 pivots between the uncovered position, as shown in FIG. 16, so that the plate 24 is substantially aligned with the bottom surface 60 of the notebook computer housing 38 and a retained position, as shown in FIGS. 7, 8 and 10, where the cover plate 24 is substantially flush with the rear surface 30 of the notebook computer 32. The single blocking shoulder/hinge device is preferably positioned intermediate and, more particularly, at the longitudinal mid-point of the cover plate 24 to evenly distribute the loading thereon.

As best shown in FIGS. 9 and 10 the notebook computer includes a number of electrical connectors including a serial connector 62, a parallel printer connector 64, a video connector 66, a numeric keypad connector 68, a keyboard/mouse connector 70 and a A/C adaptor/battery charger connector 72. Generally, the expansion base connector 22 is connected with the connector D of the expansion base C, as shown in FIG. 1, when the notebook computer is used in combination with the expansion base. However, when the notebook computer is used independent of the expansion base, any number and combination of the connectors could be used and therefore the cover assembly should be in the uncovered position, as shown in FIG. 9.

Though the preferred embodiment of the present invention was described to show the connection of the expansion base connector, any of the connectors could be the preselected connector and use the invention as disclosed herein. For example, there has been a need for connecting a printer K, such as shown in FIG. 3, directly to the notebook computer when the notebook computer is used independent of the expansion base. In this situation, the plate opening in plate 24 could be sized and aligned so that a corresponding printer connector from a printer could be received into printer connector 64, as shown in FIG. 9. In this alternative embodiment, when the cover plate 24 is in the retained position, the notebook computer can be electrically connected with the printer while the other notebook computer connectors are covered.

Additionally, the invention could be adapted for use with any connector found on a computer such as an A/C adaptor/battery connector, charger connector, keyboard/mouse connector, numeric keypad connector, video connector, serial connector and any similar electrical connector.

The foregoing disclosure and description of the invention are illustrative and explanatory thereof, and various changes in the size, shape and materials, as well as in the details of the illustrated construction may be made without departing from the spirit of the invention.

We claim:

1. Apparatus adapted for covering a plurality of electrical connectors of a housing of a notebook computer having an expansion base connector to provide electrical connection of the notebook computer to an expansion base, the apparatus comprising,
   a first plate having an opening, said opening sized to allow access to the expansion base connector,
   hinge means for pivotably mounting said first plate with the housing, said plate pivotable relative to the housing between an uncovered position to provide access to the plurality of electrical connectors and a retained position for covering the electrical connectors while allowing access to the expansion base connector,
   a door adapted to cover said plate opening when said plate is in the retained position, said door slidable relative to said plate opening between a closed position and an open position for allowing access to the expansion base connector to provide electrical connection to the notebook computer, and
   retaining means interengaged with the housing and said plate for positioning said plate in a prearranged relationship to the housing.

2. Apparatus adapted for covering a plurality of electrical connectors of a housing of a notebook computer having an expansion base connector to provide electrical connection of the notebook computer to an expansion base, the apparatus comprising,
   a first plate having an opening, said opening sized to allow access tot he expansion base connector,
   mounting means for movably mounting said first plate with the housing, said plate movable relative to the housing between an uncovered position to provide access to the plurality of electrical connectors and a retained position for covering the electrical connectors while allowing access to the expansion base connector, and
   a door adapted to cover said plate opening when said plate is in the retained position, said door movable relative to said plate opening between a closed position and an open position for allowing access tot he expansion base connector to provide electrical connection of the notebook computer to the expansion base.

3. Apparatus of claim 2 further comprising pivot means interengaged with the housing and said first plate for providing pivotable movement of said plate to the housing.

4. Apparatus of claim 2 further comprising stop means interengaged with the housing and said first plate for limiting movement of said plate to the housing.

5. Apparatus of claim 4 wherein said stop means includes blocking shoulders on the housing and said plate.

6. Apparatus of claim 2 further comprising a bottom surface and a rear surface of the notebook computer wherein said first plate being pivotable 90° relative to the housing between an uncovered position for allowing access to a plurality of connectors wherein said plate is substantially aligned with the bottom surface of the notebook computer and a retained position wherein said first plate is substantially flush with the rear surface of the notebook computer.

7. Apparatus of claim 4 further comprising a first end and a second end of said plate wherein said stop means being positioned intermediate said plate ends.

8. Apparatus of claim 7 further comprising retaining means interengaged with the housing and on the first end and second end of said plate for positioning said plate in a prearranged relationship to the housing.

9. Apparatus of claim 8 wherein said retaining means comprises resilient fingers on each end of said plate and a retaining slot in the housing.

10. Apparatus of claim 9 wherein said resilient fingers being movable relative to the housing between an extended interference position and a retracted position for allowing movement of said plate between said uncovered position and said retained position.

11. Apparatus of claim 2 further comprising,
tab means positioned on said plate for moving said plate from said retained position to said uncovered position.

12. Apparatus of claim 2 further comprising,
a second plate having an opening, said second plate adapted to interengage said first plate wherein said first plate opening communicates with said second plate opening to allow access to the expansion base connector.

13. Apparatus of claim 12 further comprising
guide means disposed between said first plate and said second plate for controlling and guiding relative sliding movement of said door to said plates.

14. Apparatus of claim 13 wherein said second plate being inserted within said first plate.

15. Apparatus of claim 12 further comprising alignment means interengaged between the first plate and second plate for aligning said plates.

16. Apparatus of claim 2 wherein the housing of the notebook computer further comprises a plurality of ports including an expansion base port to communicate with a plurality of connectors including the expansion base connector wherein when said door is in the open position and the first plate is in the retained position, the notebook computer expansion base connector is adapted to be electrically connected with the expansion base while the other notebook computer connectors are covered by said first plate.

17. Apparatus adapted for covering a plurality of electrical connectors including an expansion base connector of a housing of a notebook computer while allowing electrical connection of the notebook computer to an expansion base, wherein the notebook computer is adapted to be slidably connected with the expansion base, the apparatus comprising,
a first plate having an opening, said opening sized to allow access tot he expansion base connector and positioned so that said notebook computer is adapted to be slidably connected with the expansion base,
mounting means for movably mounting said first plate with the housing, said plate movable relative to the housing between an uncovered position to provide access to the plurality of electrical connectors and a retained position for covering the electrical connectors while allowing access to the expansion base connector, and
a door adapted to cover said plate opening when said plate is in the retained position, said door movable relative to said plate opening between a closed position and an open position for allowing sliding the notebook computer into electrical connection with the expansion base.

18. Apparatus of claim 17 further comprising a bottom surface and a rear surface of the notebook computer wherein said first plate being pivotable 90° relative to the housing between an uncovered position for allowing access to a plurality of connectors wherein said plate is substantially aligned with the bottom surface of the notebook computer and a retained position wherein said first plate is substantially flush with the rear surface of the notebook computer to allow slidable connection of the notebook computer with the expansion base.

19. Apparatus of claim 17 further comprising,
a second plate having an opening, said second plate adapted to interengage said first plate wherein said first plate opening communicates with said second plate opening to allow slidable connection of the notebook computer with the expansion base.

20. Apparatus of claim 17 wherein the housing of the notebook computer further comprises a plurality of ports including an expansion base port to communicate with a plurality of connectors including the expansion base connector wherein when said door is in the open position and the first plate is in the retained position, the notebook computer expansion base connector is adapted to be slidably connected with the expansion base while the other notebook computer connectors are covered by said first plate.

* * * * *

UNITED STATES PATENT AND TRADEMARK OFFICE
CERTIFICATE OF CORRECTION

PATENT NO.    :  5,199,888
DATED         :  APRIL 6, 1993
INVENTOR(S)   :  NEIL L. CONDRA, ET AL.

It is certified that error appears in the above-identified patent and that said Letters Patent is hereby corrected as shown below:

In Col. 6, Line 50, please replace "tot he" with --to the--.

In Col. 6, Line 62, please replace "tot he" with --to the--.

In Col. 8, Line 12, please replace "tot he" with --to the--.

Signed and Sealed this

Eighteenth Day of January, 1994

*Attest:*

BRUCE LEHMAN

*Attesting Officer*  *Commissioner of Patents and Trademarks*